United States Patent [19]

Sugalski

[11] Patent Number: 5,356,589
[45] Date of Patent: Oct. 18, 1994

[54] METHOD AND APPARATUS FOR FORMING ROTATIONALLY CAST TANK LINER HAVING AN END FITTING

[75] Inventor: Charles Sugalski, Portage, Ohio

[73] Assignee: Essef Corporation, Chardon, Ohio

[21] Appl. No.: 28,231

[22] Filed: Mar. 9, 1993

[51] Int. Cl.[5] .................. B29C 33/02; B29C 33/12; B29C 33/40; B29C 39/10
[52] U.S. Cl. ............................ 264/265; 264/269; 264/306; 264/310; 264/327; 425/117; 425/429; 425/435
[58] Field of Search .............. 264/265, 310, 301, 303, 264/306, 268, 327, 40.1, 255, 279, 279.1, 274, 254, 267, 269, 302; 425/110, 117, 429, 435, 434

[56] References Cited

U.S. PATENT DOCUMENTS

| | | | |
|---|---|---|---|
| 1,811,086 | 6/1931 | Kasch | 264/265 |
| 2,786,238 | 3/1957 | Shapero | 264/306 X |
| 2,830,325 | 4/1958 | Bray | 264/303 X |
| 2,848,133 | 8/1958 | Ramberg . | |
| 2,983,959 | 5/1961 | Shapero et al. | 264/303 X |
| 3,134,140 | 5/1964 | Knowles | 425/429 |
| 3,301,925 | 1/1967 | Engel | 264/310 X |
| 3,508,677 | 4/1970 | Laibson et al. . | |
| 3,657,941 | 4/1972 | Engler | 264/310 X |
| 3,874,544 | 4/1975 | Harmon . | |
| 3,907,149 | 9/1975 | Harmon . | |
| 4,155,966 | 5/1979 | Tschanz et al. | 264/327 X |
| 4,217,325 | 8/1980 | Colby | 264/245 |
| 4,357,293 | 11/1982 | Williamson, Jr. | 264/310 X |
| 4,621,995 | 11/1986 | Wersosky | 264/327 X |
| 4,623,503 | 11/1986 | Anestis et al. | 264/327 X |
| 4,705,468 | 11/1987 | LeBreton . | |
| 4,954,299 | 9/1990 | Gries et al. | 264/265 X |
| 4,976,910 | 12/1990 | Gatley et al. | 264/310 X |
| 5,073,325 | 12/1991 | Gray | 264/327 X |

FOREIGN PATENT DOCUMENTS 2146607  6/1987  Japan ......................... 264/265

Primary Examiner—Karen Aftergut
Attorney, Agent, or Firm—Pearne, Gordon, McCoy & Granger

[57] ABSTRACT

Method and apparatus for rotationally casting a plastic tank liner having a molded-in access fitting and for ensuring a uniform thickness of plastic in the wall of the liner and on the fitting. A hollow mold having a mold cavity surface conforming to the surface of the liner is provided. An access fitting is removeably mounted on the mold so that the interior surface of the fitting may be coated with the molding plastic and so that the molded liner and the filling may be removed from the mold as a unit. The mold is rotated about orthogonal axes while the mold is heated to a resin liquifying temperature. Additional heat is supplied to the fitting at a rate proportional to the mass of the fitting so that the temperature of the inside surface of the fitting is increased at a rate substantially corresponding to the inside surface temperature of the mold.

7 Claims, 3 Drawing Sheets

METHOD AND APPARATUS FOR FORMING ROTATIONALLY CAST TANK LINER HAVING AN END FITTING

BACKGROUND OF THE INVENTION

This invention relates generally to pressure vessels having adaptor fittings mounted thereon to provide access to the interior of the vessel. The invention is particularly concerned with the techniques for manufacturing filament- wound plastic pressure vessels which contain corrosive and/or pressurized fluids. Pressure vessels of this type generally include a rotationally cast or blow-molded inner plastic liner which is wound with resin-impregnated glass filaments to provide adequate mechanical and structural properties for the sidewall of the vessel. A typical pressure vessel would comprise a cylindrical sidewall having oblate, ellipsoidal end portions, at least one of which is provided with an axial fitting which, in turn, is adapted to be connected to a closure member or to plumbing connections. According to the prior art, metallic and plastic fittings are associated with plastic liners by fusion or molding techniques, and the sub-assembly of the fitting and the liner are wound with resin-impregnated filaments. Examples of such pressure vessels may be found in U.S. Pat. Nos. 2848133; 3874544; 3508677; 3907149; and 4705468.

In U.S. Pat. No. 4,705,468 granted to LeBreton, there is disclosed a technique for rotationally casting a plastic liner for a pressure vessel having an access fitting molded therein. According to that patent, the apparatus includes a rotational casting arm having a mold supporting surface which is adapted to be rotated about orthogonal axes. A hollow mold having a mold cavity surface conforming to the outside surface of the liner to be molded is removably attached to the mold supporting surface together with a metal access fitting. The metal access fitting has a longitudinal axis aligned with one of the orthogonal axes and has at least a first surface portion extending into the mold cavity. The first surface portion and the surface of the mold cavity are coated with plastic upon molding rotation to form the plastic liner.

It has been found that in practicing the invention set forth in the LeBreton patent, the plastic resin which coats the first surface portion of the fitting tends to be thinner than the remainder of the tank liner since the relatively large mass of the fitting does not attain the same elevated temperature as the relatively thin mold wall sections during the dwell time of the mold in the heating chamber. As a consequence of this molding operation, a relatively thin coating of resin is formed on the interior surface of the fitting which may permit liquid contained in a completed pressure vessel to seep through and contact the fitting itself. Moreover and in most cases, a thin plastic lining on the interior of the fitting tends to delaminate and pull away from the fitting upon cooling. To overcome this tendency, excess molding composition is used to ensure that the coating on the interior of the fitting is of sufficient thickness. While in many cases excess molding composition is not detrimental in an engineering sense, it necessarily adds to the cost and weight of the item. When expensive molding compounds are employed, significant cost increases in the finished product will result.

SUMMARY OF THE INVENTION

This invention relates to a technique for rotationally coating a tank liner having a molded-in access fitting and for ensuring that a uniform coating of resin is formed on the mold and the interior of the fitting without thinning or delaminating. According to this invention, a hollow mold having a mold cavity surface conforming to the inner surface of the liner is provided. The mold is typically constructed from relatively thin aluminum to ensure relatively rapid heat transfer to the interior of the mold. An access fitting which is intended to be molded into and remain as a part of the tank liner, is removably mounted in an aperture in the mold casing. A flange portion of the fitting is positioned in the mold aperture so that it may be coated with the molding resin. A neck portion of the fitting extends beyond the aperture and is provided with a removable cap during molding. With a predetermined amount of thermoplastic resin deposited in the hollow mold, the mold is rotated about two axes of revolution. The rotating mold is indexed to a heating oven and the temperature of the mold is raised to a predetermined molding temperature which causes the resin to flow and coat the interior of the mold. The quantity of heat supplied to the mold is increased at the fitting at a rate proportional to the mass of the fitting so that the temperature of the inside surface of the fitting attains a temperature corresponding to the surface temperature of the remainder of the mold surface in a relatively short time.

According to a preferred aspect of this invention, the manner in which heat is supplied to the fitting is by forcing heated air against the protruding neck portion of the fitting. To this end a plurality of radially inwardly directed nozzles are provided which surround the neck portion of the fitting and heated air is forced through the nozzles during the time that the mold is rotating within the heating chamber. Other mechanisms for supplying heat to the fitting may be employed; such as electrical band heaters, induction coils, or the like.

DETAILED DESCRIPTION OF THE INVENTION

Figure 1:
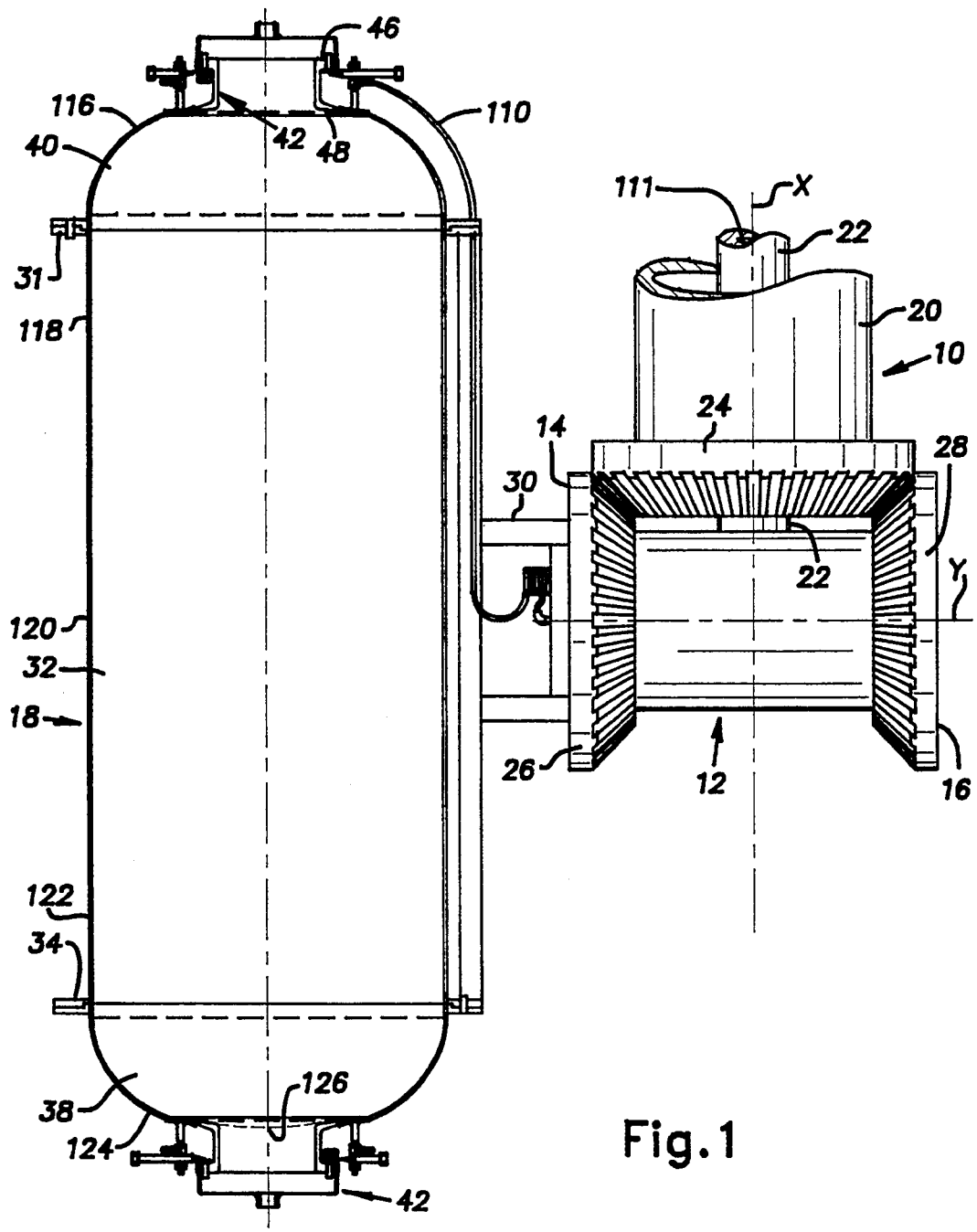
FIG. 1 is an elevational view of a mold mounted on the casting arm of a rotational casting machine for producing plastic tank liners according to this invention.

Referring now to the drawings, there is illustrated a portion of a conventional rotational casting apparatus comprising a rotational casting arm 10 and a mounting head 12. The casting arm 10 is one of a plurality of arms which may be found on a typical rotational casting machine and the mounting head 12 includes mounting surfaces 14 and 16 for mounting a hollow mold 18. A similar or identical mold (not shown) may be mounted on the surface 16 or a counterweight may be provided. The arm 10 comprises an outer shell 20 which is fixed with respect to rotation about its longitudinal axis and includes a rotatable inner shaft 22. The shaft 22 is fixed to the head 12 and rotates the head about the axis of the shaft 22. A bevel gear 24 is fixed to the outer shell 20 and meshes with a pair of axially aligned bevel gears 26 and 28 which are rotatably mounted on the head 12. Rotation of the shaft 22, therefore, causes the mold 18 to be simultaneously rotated about the axis X and about the axis Y.

A conventional rotational casting molding operation consists of placing a plastic molding compound in finely divided form inside the hollow mold 18. The mold 18 is indexed to a heating oven (not shown) and is then heated to a temperature above the melting point of the plastic. At the same time, the mold is rotated about the axes X and Y. The powdered plastic inside the mold is heated by the heat transferred from mold surface and sticks to the inner mold surface. Heating is continued for a sufficient length of time for complete melting of all of the plastic particles, and to permit bubbles to be released from the molten plastic. The thickness of the plastic article is determined by the amount of plastic placed within a given mold and the uniformity of thickness is dependent upon the uniformity of temperature on the molding surface.

The mold 18 is fixed to the mounting surface 14 by a mounting assembly 30 and is rotatable with the bevel gear 26. The mold 18 as may be seen in FIGS. 1 and 2, includes a cylindrical sidewall 32 fabricated from thin gauge aluminum sheet. The sidewall 32 is provided with end flanges 34 and 31 which are respectively bolted to end caps 38 and 40. In the illustrated embodiment, the end caps 38 and 40 are identical and each end cap carries an axis fitting 42. Only the end cap 40 and its fitting 42 will be described in further detail since these assemblies are essentially identical. Moreover, the end cap 38 may be modified to eliminate its illustrated fitting 42. In such an instance, only a single fitting 42 may be provided in the completed liner. The fitting 42 may be fabricated from metal or plastic and comprises a cylindrical neck portion 44 provided with an annular flange 46 at one end and an annular tapered foot or radially outwardly extending flange portion 48 at its other end. The annular tapered foot 48 is received within a recess 50 in a circular opening 52 provided in a mounting ring 53 welded to the end cap 40. The end cap 40 and the fitting 42 are pre-assembled prior to application to the cylindrical sidewall 32 by a fitting mounting assembly 54 mounted on the ring 53. The assembly 54 includes a plurality of pairs of posts 56 having thread-end portions 58. Mounting blocks 60 are carried by the threaded end portions 58 and are secured thereon by nuts 62. Each mounting block 60 is provided with upper and lower threaded apertures 64 and 66, respectively. Each aperture 64 receives a mounting pin 68 which has a threaded body portion 70 and a tapered end 72.

Figure 2:
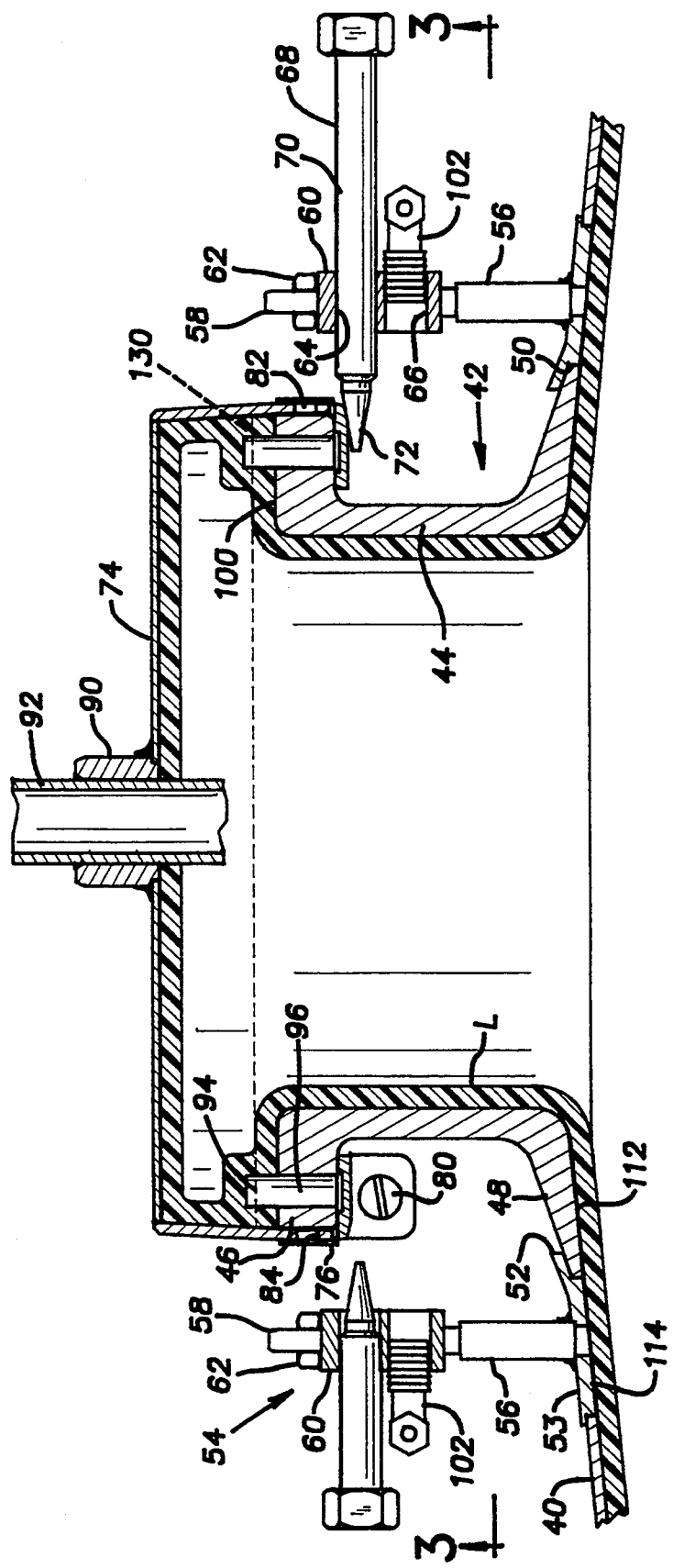
FIG. 2 is an enlarged cross-sectional view of the mold showing details of the fitting and the molded-in liner.
Figure 3:
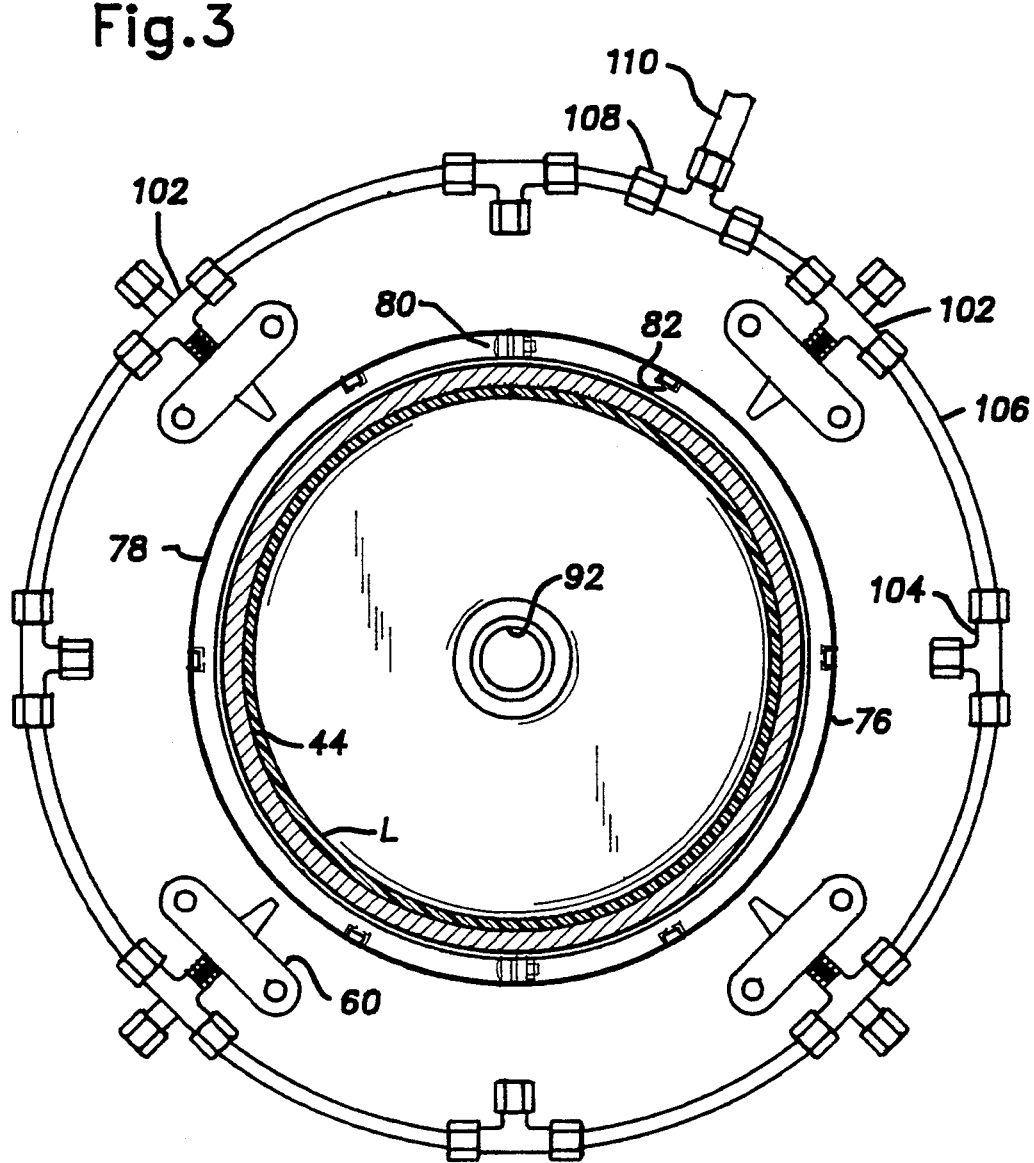
FIG. 3. is a cross-sectional view, the plane of the section being indicated by the line 3—3 in FIG. 2.

As may seen most clearly in FIG. 2, the fitting 42 is provided with a molding cap 74 which is cup-shaped and which slips over the annular flange 46 of the fitting 42. The cap 74 is retained on the flange during a molding operation by a pair of semi-circular retaining channels 76 and 78 (FIG. 3) which are fastened together by bolts 80 and which have a series of radially inwardly projecting tabs 82 which are received in apertures 84 in the cap 74. The tapered end portions 72 of the pins 68 engage the lower leg of the retaining channels 76 and 78 and upon tightening the pins 68, the fitting 42 is urged firmly into the recess 50 in the mounting ring 53. The cap 74 may be provided with a centrally located nipple 90 which in turn may be provided with a tube 92 for venting the interior of the mold during rotational casting or for applying a vacuum thereto. The retaining channels 76 and 78 are further provided with a series of pins 94 which extend through bolt receiving apertures 96 in the flange 46 to prevent molding composition from entering the aperture and to ensure that the liner will have a corresponding opening.

With the mold assembled as shown in the drawings and with a predetermined amount of resin deposited therein, the arm 10 is indexed to a position within the heating chamber of a rotational casting machine. The outer shell 20 of the arm is rotated in the previously described manner to rotate the mold 18 about the axes X and Y to form a liner L which covers the inside surface of the mold 18 and the fitting 42. For a liner which has a length of 47 inches and a diameter of 14 inches with a 4½ inch aluminum fitting, a shot weight of 14 pounds of powdered resin is employed. With a typical dwell time in the oven of 15 minutes, 30 seconds at 500° F. according to prior art practices, the as-cast wall thickness of the liner tends to thin out at the surface of the fitting 42, particularly, at a top surface 100 of the flange 46. This non-uniformity in wall thickness of the resin liner may be attributed to the fact that the temperature of the interior of the fitting 42 is not raised as rapidly as the temperature of the sidewall and end caps of the mold since those elements of the mold are relatively thin and attain a temperature which is conducive to resin liquification prior to the fitting 42. Extended dwell periods in the heating chamber of the rotational casting machine do not ensure that the resin covering the inside of the fitting 42 will increase in thickness as a function of time. This is due to the fact that when the resin liquifies, it tends to remain as a pasty mass at the point of liquification and is not moved to other areas on the mold surface by movement of the mold about the X and Y axes.

According to this invention, the quantity of heat supplied to the fitting 42 is increased at a rate proportional to the mass of the fitting so that the temperature of the inside surface of the fitting is increased to conform to the temperature of the remainder of the mold. This is accomplished in the following manner. The apertures 66 in the mounting blocks 60 are threaded and receive male tee fittings 102. Other tee fittings 104 are interspersed between the fittings 102 and the entire assembly is tied together by tubing 106 to form a manifold which is connected to a union tee 108 which in turn communicates with a tube 110. As may be seen in FIG. 1, the tube 110 communicates with a passage 111 in the shaft 22 through a sealed and rotatable connector (not shown) between the head 12 and the gear 14. Heated air at a temperature corresponding to the temperature of the still air in the heating chamber, e.g. 500° F., is forced through the tube 110 at an elevated pressure of between 20 and 40 psig. This heated air is blown against the neck portion of the fitting 42 during the time that the mold is rotated in the heating chamber.

The following table illustrates wall thicknesses in inches of the molded tank liner in various locations described in the table. Those locations include reference numerals 100, 112, 114, 116, 118, 120, 122, 124 and 126 in the drawings. As may be noted, four readings were taken about the circumference of the tank at each location.

TABLE

| | TEFLON HOSE 20 psi AIR | | NO AIR ST'D | | COILED COPPER TUBE 20 psi AIR | | COILED COPPER TUBE 40 psi AIR | |
|---|---|---|---|---|---|---|---|---|
| Liner No. | 11025911 | | 21025911 | | 11029911 | | 11030911 | |
| TOP FLANGE 100 | .113 | | .090 | | .138 | | .152 | |
| | .104 | | .087 | | .132 | | .153 | |
| | .100 | | .088 | | .128 | | .156 | |
| | .111 | avg. .107 | .086 | avg. .088 | .132 | avg. .132 | .156 | avg. .154 |
| UNDER FLANGE 112 | .185 | | .152 | | .171 | | .210 | |
| | .160 | | .155 | | .182 | | .202 | |
| | .172 | | .141 | | .185 | | .204 | |
| | .176 | avg. .174 | .144 | avg. .148 | .181 | avg. .180 | .207 | avg. .206 |
| FIRST INSERT RING 114 | .217 | | .219 | | .217 | | .224 | |
| | .202 | | .203 | | .239 | | .220 | |
| | .215 | | .197 | | .254 | | .218 | |
| | .213 | avg. .212 | .215 | avg. .209 | .230 | avg. .235 | .231 | avg. .223 |
| 4" FROM FLANGE (Dome) 116 | .226 | | .214 | | .238 | | .237 | |
| | .237 | | .232 | | .229 | | .233 | |
| | .221 | | .230 | | .232 | | .234 | |
| | .216 | avg. .225 | .213 | avg. .222 | .240 | avg. .235 | .244 | avg. .237 |
| 4" FROM PARTING LINE (Sidewall) 118 | .197 | | .209 | | .209 | | .215 | |
| | .189 | | .190 | | .191 | | .209 | |
| | .190 | | .186 | | .182 | | .202 | |
| | .186 | avg. .191 | .198 | avg. .196 | .201 | avg. .196 | .207 | avg. .208 |
| CENTER 120 | .207 | | .208 | | .205 | | .220 | |
| | .195 | | .200 | | .195 | | .214 | |
| | .183 | | .194 | | .178 | | .209 | |
| | .202 | avg. .191 | .180 | avg. .196 | .207 | avg. .196 | .193 | avg. .209 |
| 4" FROM PARTING LINE (Sidewall) 122 | .198 | | .198 | | .207 | | .212 | |
| | .191 | | .182 | | .196 | | .209 | |
| | .184 | | .186 | | .207 | | .204 | |
| | .188 | avg. .190 | .174 | avg. .185 | .182 | avg. .198 | .203 | avg. .207 |
| 4" FROM TAILPIECE (Dome) 124 | .222 | | .221 | | .232 | | .242 | |
| | .219 | | .217 | | .240 | | .230 | |
| | .228 | | .220 | | .256 | | .230 | |
| | .210 | avg. .220 | .190 | avg. .212 | .230 | avg. .240 | .213 | avg. .229 |
| TAILPIECE 126 | .225 | | .225 | | .200 | | .228 | |
| | .206 | | .205 | | .231 | | .216 | |
| | .205 | | .197 | | .226 | | .213 | |
| | .199 | avg. .209 | .187 | avg. .203 | .226 | avg. .224 | .216 | avg. .218 |
| FINISH WEIGHT (in pounds) | 16.0 | | 16.2 | | 16.2 | | 16.4 | |

It may be seen that the thickness of the plastic is increased in those portions of the liner which form a coating on the fitting 42 where heated air is forcibly directed at the fitting 42 during the heating step. Also note that the "tailpiece" comprises a plain end cap without a fitting 42.

After the rotational casting operation is completed and the mold is cooled, the liner and the fitting are removed from the mold as a unit and the cap 74 is removed from the fitting. The liner is then sliced along the phantom line 130 to remove the excess plastic and to remove the plastic formed around the pins 94. The completed mold liner and its fitting may then be wound with a continuous filament to provide a fiber-reinforced plastic pressure vessel.

Although the preferred embodiments of this invention have been shown and described, it should be understood that various modifications and re-arrangements of the parts may be resorted to without departing from the scope of the invention as disclosed and claimed herein.

What is claimed is:

1. A method of rotationally casting a tank liner having a uniform thickness and a molded-in access fitting comprising the steps of providing a hollow mold having a mold cavity surface conforming to a surface of said liner, said mold having wall portions of increased thickness at selected sites, depositing a predetermined amount of thermoplastic resin in said hollow mold, rotating said mold about two axes of revolution while subjecting said mold in its entirety to an elevated temperature to liquify said resin and coat said mold cavity surface with said liquid resin, and increasing a quantity of heat supplied to said mold at least at one of said selected sites at a rate proportional to said increased thickness of said wall portion at said at least one selected site so that a temperature of said surface of said mold cavity at said at least one selected site is increased at a substantially uniform rate to attain said elevated temperature to thereby provide for formation of said tank liner having said uniform thickness and molded-in access fitting, cooling said mold to solidify said liner and removing said liner from said mold.

2. A method according to claim 1 wherein at least one of said selected sites comprises a liner access fitting removably attached to an aperture in said mold, an inside surface of said fitting comprising a portion of said mold cavity surface.

3. A method according to claim 2 wherein said liner is adhered to said fitting and said fitting is removed from said mold as a part of said liner.

4. A method according to claim 1 wherein said mold is heated to an elevated temperature of 500° F.

5. A method according to claim 2 wherein heated air is blown against said fitting.

6. A method according to claim 5 wherein said fitting includes a neck portion extending axially from said mold and wherein said heated air is blown radially inwardly toward said neck portion.

7. Apparatus for rotationally casting a plastic liner for a pressure vessel having an access fitting rotationally cast therein and having a uniform thickness, said apparatus comprising a rotational casting arm having a mold-supporting surface rotatable about two axes of revolution, a hollow mold having a mold cavity surface conforming to an outside surface of said liner to be molded and being heated to an elevated temperature to liquify a plastic molding composition, means removably attaching said mold-supporting surface to said hollow mold, said mold including an aperture, mounting means for removably attaching said access fitting to said mold, said access fitting having a neck and flange, said neck extending axially in said aperture and said flange extending in said mold radially outward of said neck, said flange and neck defining an inside surface which together with said surface of said mold cavity, cooperates to form a shape of said liner and is coatable with said plastic molding composition to form said liner, said flange having an outside surface which is retained against a portion of said mold cavity by said mounting means, said neck having an outside surface projecting outwardly from said aperture, and means mounted on said mold to direct heated air toward said outside surface of said neck to provide for formation of said plastic liner having said uniform thickness by increasing a quantity of heat supplied to said mold at said access fitting at a rate proportional to a mass of said fitting so that a temperature at said inside surface of said fitting attains said elevated temperature of said mold cavity surface in a relatively short tim.

* * * * *